73-658 SR

XR 2,802,178

SEARCH ROOM

SUBSTITUTE FOR MISSING XR

CROSS REFERENCE

Aug. 6, 1957 S. N. SHAFER ET AL 2,802,178

MOTION DETECTING DEVICE

Filed Sept. 22, 1954

Inventors:
Sylvester N. Shafer,
Robert Plunkett,
by Merton D. Moore
Their Attorney.

United States Patent Office 2,802,178

Patented Aug. 6, 1957

2,802,178

MOTION DETECTING DEVICE

Sylvester N. Shafer and Robert Plunkett, Schenectady, N. Y., assignors to General Electric Company, a corporation of New York Application September 22, 1954, Serial No. 457,682

5 Claims. (Cl. 324—61)

This invention relates to a motion detecting device, and more particularly to a capacitive pickup element associated with a suitable electronic circuit by means of which mechanical motion may be translated into an electrical quantity that is proportional to the amplitude of mechanical motion.

In many phases of modern industry, there is need for a small convenient instrument for measuring relatively minute mechanical motions, such as those encountered in testing rotating machinery for vibration. To attain its maximum utility, the device must measure vibratory amplitude without touching or affecting the vibratory system and should produce a linear output signal; that is, the amplitude of the output signal should vary directly with the amplitude of the motion being measured. Accordingly, a primary object of the present inventon is to provide a motion detecting device that fully meets the aforementioned requirements.

Another object is to provide a motion detecting device that utilizes the change in capacitance between the moving object and a capacitive pickup due to the motion of the object as the basic variable, and which has associated therewith a relatively uncomplicated electronic circuit.

Another object of the invention is to provide a motion detecting device embodying a capacitive pickup element wherein the capacitance in parallel with the pickup device is minimized by the construction of the pickup element, and is further reduced by the electronic circuit associated with the pickup, thus providing maximum sensitivity.

A further object of the invention is to provide such a device which operates without the use of a carrier signal, thus eliminating complex circuitry and possible interference with other electronic equipment.

A motion detecting device constructed in accordance with the invention comprises essentially a small probe-like capacitive pickup element and an associated cathode follower amplifier circuit. The capacitive pickup comprises a small electrically conducting tube into which a double shielded cable is inserted, with the outer shield of the cable being connected to the tube. The center conductor of the double shielded cable acts as the pickup element, and it is the change in capacitance between the center conductor and the vibrating object that provides the electric signal whose amplitude is a measure of the amplitude of vibration of the object.

The outer shield of the double shielded cable is grounded, the inner shield of the cable is connected into the cathode circuit of a cathode follower amplifier, and the inner conductor of the cable is connected to the control grid of the amplifier. Because of the novel construction of the capacitive pickup, there is a very small capacitance in parallel with the pickup, and the cathode follower circuit further minimizes the effect of that capacitance. Thus, the motion detecting device of the invention embodies a high degree of sensitivity and accuracy, and the amplitude of the output signal from the cathode follower is directly proportional to the amplitude of the movement of the object.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawing, in which:

Figure 1:
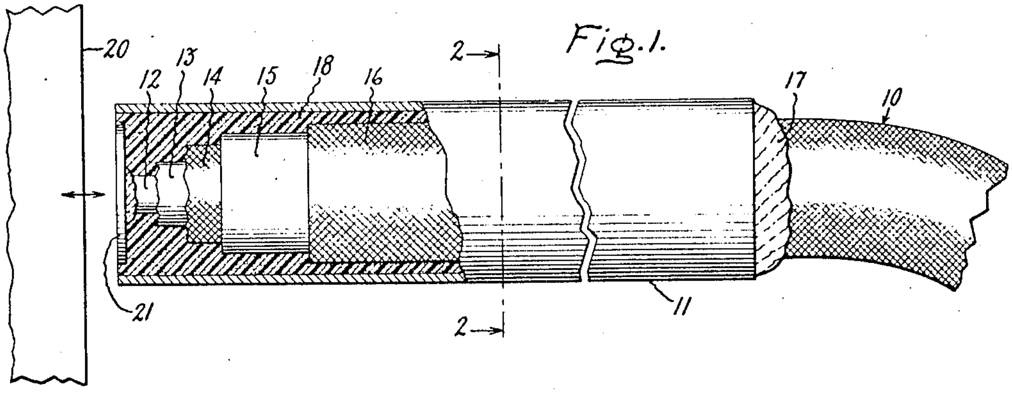
Fig. 1 is a side elevation of the capacitive pickup embodied in the invention, with parts broken away to show clearly the internal construction.
Figure 2:
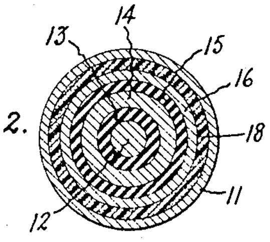
Fig. 2 is a sectional view taken on the line 2—2 of Fig. 1.

Referring now to Figs. 1 and 2 of the drawing, it is seen that the capacitive pickup element of the invention comprises a double shielded cable 10 and an electrically conducting tube 11 into which the cable 10 extends. The double shielded cable 10 is of conventional commerically available type, and comprises an inner conductor 12, a layer of insulation 13, an inner shield 14, a layer of insulation 15, and an outer shield 16. The outer shield of the cable 10 may be physically and electrically connected to the tube 11 as by solder 17 at the rear end of the tube. The distance which the outer shield 16 extends into the tube 11 is of no particular importance, thus it may be cut off at any desired point. The interior of the tube 11 is filled with a nonconducting, high dielectric cement 18 to insulate the various elements of the pickup one from another and maintain the cable substantially coaxial with the tube 11. Any commercially available cement having the aforementioned properties may be utilized for this purpose, and it has been found that a cement known as Epon #828 manufactured by the Shell Oil Co., New York, N. Y., is well suited for this purpose.

In use, the capacitive pickup is positioned with its end adjacent an object 20 whose vibratory motion is to be measured. In order to provide maximum sensitivity to changes in capacitance between the inner conductor 12 of the capacitive pickup and the object 20, an electrically conducting button 21 is soldered or otherwise electrically connected to the end of the inner conductor 12, and is substantially flush with the outer end of the tube 11. The button 21 is only slightly smaller in diameter than the inside diameter of the tube 11 so that it substantially fills the opening therein, and the small space between the edge of the button and the tube is filled with the high dielectric cement 18. The inner shield 14 of the double shielded cable is terminated as close as practicable to the back or inner side of the button 21 to provide the maximum amount of shielding between the inner conductor 12 and the tube 11 and reduce the capacitance between these elements to a minimum. In the drawing, the inner shield 14 is shown as cut somewhat short in order to show the internal construction of the cable as clearly as possible, but in practice it might be separated from the button by .020 inch, for example.

In a typical application, the tube 11 may be made of brass approximately 4 inches in length and 3⁄16" in outside diameter, and may be held conveniently by an operator. The length of the tube 11 is determined primarily by convenience in use and may be reduced to ½" or less, if desired for particular applications. Of course, the double shielded cable 10 must be the proper size to fit easily within the tube 11.

Figure 3:
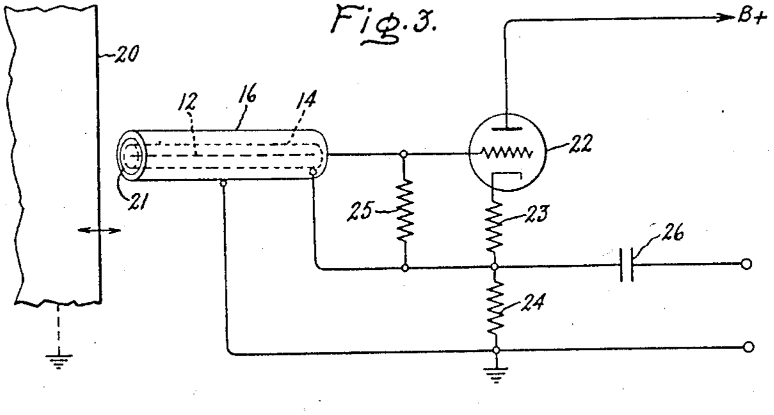
Fig. 3 is a schematic diagram of the complete device, including the capacitive pickup element and the associated electronic circuitry.

Referring now to the schematic diagram shown in Fig. 3, it is seen that the inner conductor 12 of the capacitive pickup is connected directly to the control grid of a cathode follower amplifier 22. The cathode circuit of the cathode follower amplifier 22 includes a biasing resistor 23 and a load resistor 24, and the control grid of the amplifier is connected to the juncture of resistors 23 and 24 through a grid resistor 25. The inner shield 14 of the capacitive pickup is also connected to the juncture of resistors 23 and 24, and the outer shield 16 and tube 11 of the pickup are grounded. The anode of the cathode follower amplifier 22 is connected to a source of positive D.-C. potential (not shown) and the output is taken from across the load resistor 24 through a capacitor 26.

A positive charge is built up between the inner conductor 12 of the capacitive pickup and ground because of the conduction of the cathode follower amplifier 22 and the voltage drop voltage across resistor 24. As the pickup is held with the button 21 adjacent a grounded metallic object, such as the object 20 whose vibration is to be measured, the capacitance between the button 21 and ground will change in accordance with the vibration of the object 20. Because the time constant of the circuit through which the charge must dissipate is very long, the charge may be considered a constant and the change in capacitance due to motion of the object 20 will cause the voltage present on the inner conductor 12 and on the control grid of the cathode follower amplifier to change. This result is apparent from the well known expression $$V=\frac{Q}{C}$$

where V is voltage, Q is the charge and C is the capacitance. Thus, as the capacitance between the object 20 and the button 21 changes, the voltage on the grid of the cathode follower amplifier 22 changes and an output signal appears across the resistor 24 in the cathode circuit of the amplifier.

The output signal appearing across resistor 24 may be coupled through capacitor 26 to the input of a high impedance amplifier such as is included in an electronic voltmeter or cathode ray oscilloscope. The capacitor 26 serves not only as a coupling capacitor but may also remove any low frequency signal due to random movements of the operator's hand that change the spacing between the button 21 and the object under test.

It is now apparent that the novel construction of the capacitive pickup embodying a double shielded cable minimizes any capacitance that is in parallel with the capacitance between the object 20 under test and the capacitive pickup button 21. If that unwanted parallel capacitance were to exist, it would of course act as a voltage divider and materially reduce the sensitivity of the motion detecting device. Any small amount of capacitance that might exist between the inner conductor 12 and the grounded tube 11 has its effect further decreased by the cathode follower amplifier 22 to which the pickup is connected. As is well known, the amplification of a cathode follower is less than unity, although by proper selection of circuit constants it may be made to approach unity closely. In the present case, it is preferred that the amplification be as close to unity as is practicable. When this condition exists, a voltage change on the control grid of the amplifier due to a change in capacitance between the inner conductor 12 and a moving object causes a voltage change at the juncture of resistors 23 and 24 that is of the same polarity and only slightly less amplitude than the voltage change on the control grid. The inner shield 14 of the pickup is connected to the juncture of resistors 23 and 24 so that the potential of the inner conductor 12 tends to follow the potential of the inner shield 14, and no substantial potential difference exists between these two elements at any time. This fact materially increases the value of the inner shield in minimizing the capacitance between the inner conductor 12 and the grounded outer conductor 16. Thus, it is apparent that the invention provides a motion detecting device having a high degree of sensitivity wherein the effect of unwanted parallel capacitances is minimized.

It has been found in practice that the output signal from the cathode follower amplifier is essentially linear over the frequency range of 20 to 100,000 cycles per second, and is actuated to within 10%. In addition, vibration amplitudes of less than 10 microinches peak-to-peak may be measured without undue difficulty. The electronic circuitry embodied in the invention is of relatively simple construction, and its components are inexpensive and easily obtainable. The device may be used without danger of interference with other electronic equipment, because there is no oscillator associated with the device of the invention. The capacitive pickup may be made in various sizes to fit the particular application without sacrificing any of the advantages of the invention.

The following table of typical values of circuit element is presented as illustrative only, and the invention is not to be construed as being limited to construction with parameters of these values only.

| | |
|---|---|
| Amplifier 22 | Type 6SF5. |
| Resistor 23 | 10 K. |
| Resistor 24 | 250 K. |
| Resistor 25 | 20 meg. |
| Capacitor 26 | 1 uf. |
| B+ supply | 250 v. |

While there has been illustrated a particular embodiment of the invention, it will of course be understood that the invention is not limited thereto since various modifications may be made, and it is contemplated by the appended claims to cover any such modifications as fall within the true spirit and scope of the invention.

What we claim as new and desire to protect by Letters Patent of the United States is:

1. A motion detecting device comprising a tube, a cable extending into said tube and having an inner conductor, an inner shield and an outer shield, said outer shield being physically connected to said tube and electrically connected to ground, an electrically conducting button secured to the end of said inner conductor and electrically connected thereto, said button being substantially flush with the outer end of said tube and substantially filling the opening therein, said inner shield terminating adjacent the inner side of said button, a cathode follower amplifier, means connecting said inner conductor to the control grid of said cathode follower amplifier, and means connecting said inner shield to a point in the cathode circuit of said cathode follower amplifier whereby said inner conductor and said inner shield are maintained at substantially the same potential.

2. A motion detecting device comprising an electrically conducting tube, a cable extending into said tube and having an inner conductor, an inner shield and an outer shield, said outer shield terminating inside said tube and being electrically connected to said tube and ground, an electrically conducting button secured to the end of said inner conductor and electrically connected thereto, said button being substantially flush with the outer end of said tube and substantially filling the opening therein, said inner shield terminating adjacent the inner side of said button, a high dielectric material filling the interior of said tube about said cable, a cathode follower amplifier, means connecting said inner conductor to the control grid of said cathode follower amplifier, and means connecting said inner shield to a point in the cathode circuit of said cathode follower amplifier whereby said inner conductor and said inner shield are maintained at substantially the same potential.

3. A motion detecting device comprising an electrically conducting tube, a cable extending into said tube and having an inner conductor, an inner shield and an outer shield, said outer shield terminating inside said tube and being electrically connected to said tube and ground, an electrically conducting button secured to the end of said inner conductor and electrically connected thereto, said button being substantially flush with the outer end of said tube and substantially filling the opening therein, said inner shield terminating adjacent the inner side of said button, a high dielectric material filling the interior of said tube about said cable, a cathode follower amplifier having a control grid, an anode and a cathode, a biasing resistor and a load resistor connected in series between said cathode and ground, a resistor connecting said control grid to the juncture of said biasing and load resistors, means connecting said anode to a source of positive potential, means connecting said inner conductor to said control grid, means connecting said inner shield to the juncture of said biasing and load resistors whereby a change in potential on said inner conductor causes substantially the same change on said inner shield, and means connecting said outer shield to ground.

4. A capacitive pickup for a motion detecting device comprising a tube, a cable extending into said tube and having an inner conductor, an inner shield and an outer shield, said outer shield being physically connected to said tube and electrically connected to ground, and an electrically conducting button secured to the end of said inner conductor and electrically connected thereto, said button being substantially flush with the outer end of said tube and substantially filling the opening therein, said inner shield terminating adjacent the inner side of said button.

5. A capacitive pickup for a motion detecting device comprising an electrically conducting tube, a cable extending into said tube and having an inner conductor, an inner shield and an outer shield, said outer shield terminating inside said tube and being electrically connected to said tube and ground, an electrically conducting button secured to the end of said inner conductor and electrically connected thereto, said button being substantially flush with the outer end of said tube and substantially filling the opening therein, said inner shield terminating adjacent the inner side of said button, and a high dielectric material filling the interior of said tube about said cable.

References Cited in the file of this patent

UNITED STATES PATENTS

| | | |
|---|---|---|
| 2,395,309 | Wiener et al. | Feb. 19, 1946 |
| 2,428,700 | Eilenberger | Oct. 7, 1947 |
| 2,555,977 | Kline | June 5, 1951 |
| 2,579,162 | Veneklasen | Dec. 18, 1951 |
| 2,656,507 | Fielden | Oct. 20, 1953 |